Aug. 1, 1961 M. S. SCHMOOKLER 2,994,852
DECODING CIRCUIT
Filed April 14, 1960 2 Sheets-Sheet 1

INVENTOR
MARTIN S. SCHMOOKLER
BY Geoffrey Knight
ATTORNEY

United States Patent Office 2,994,852

Patented Aug. 1, 1961

2,994,852

DECODING CIRCUIT

Martin S. Schmookler, Poughkeepsie, N.Y., assignor to International Business Machines Corporation, New York, N.Y., a corporation of New York Filed Apr. 14, 1960, Ser. No. 22,179
3 Claims. (Cl. 340—147)

This invention relates to electronic computer circuits and more particularly to transistor circuits used in decoders and other computer apparatus.

Input signals to decoders using normal transistor circuits are limited in the effect they can have on the entire decoding circuit. If the input signal is present, the transistor receiving this input signal either conducts or reduces conduction. Each input signal operates a corresponding transistor receiving the signal independently of the presence or absence of other input signals to the decoder. In the present invention, certain of the input signals not only cause their corresponding transistor receiving the signal to conduct or reduce conduction, but also render the transistors receiving other input signals unaffected by the presence or absence of these other input signals to the decoder. This additional effect of certain of the input signals to the decoder is utilized in the invention to perform a decoding operation on more input signals with a given amount of transistors than was previously possible using the same amount of transistors in normal transistor circuits.

In decoders using normal transistor circuits it has become necessary, in order to cut down the amount of transistors required, to perform the decoding operation in several stages, i.e., to decode a few of the input signals in a first stage and a few more of the input signals in a second stage, and so on. However, the addition of each stage increases the amount of time required to complete the decoding operation because the transistors in one stage cannot begin switching until the transistors in the previous stage have completed switching. In electronic computers the time required to complete a decoding operation is of critical importance. In the present invention more decoding can be done in a single stage with a given amount of transistors, thereby reducing the amount of stages required to decode a set of signals. This results in a saving in the amount of time necessary to complete the decoding operation.

This invention may be used to save transistors and time not only in decoding circuits, but also in other computer apparatus using transistor circuits. The ability of certain of the inputs to the computer apparatus to render other inputs uneffective on the apparatus is an ability of fundamental importance when designing transistor circuits for performing a computing operation.

Accordingly, it is an object of this invention to provide an improved transistor circuit for rapidly performing computing operations using a small quantity of transistors.

Another object of this invention is to provide an improved decoder capable of rapidly decoding a set of signals using a small quantity of transistors.

The foregoing and other objects, features and advantages of the invention will be apparent from the following more particular description of a preferred embodiment of the invention, as illustrated in the accompanying drawings.

Figure 1:
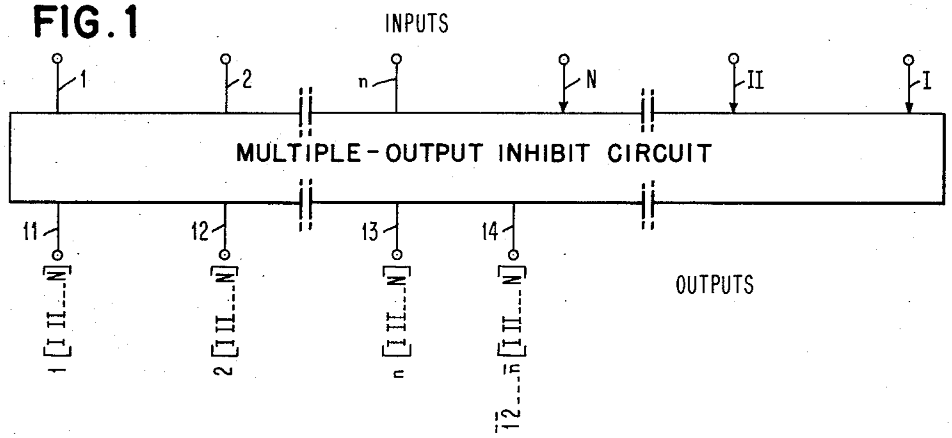
FIG. 1 is a block diagram showing the inputs and outputs to the basic circuit used in this invention.

In FIG. 1 a block diagram of a multiple-output inhibit circuit hereinafter called an M-OI circuit is shown. This block diagram shows the general form of the M-OI circuit having a first group of inputs 1, 2, through *n*, indicating that there are inputs for receiving any amount of this first group of signals. There are also inputs I, II through N, indicating that there are inputs for receiving any amount of a second group of signals.

The effect of this second group of signals I, II through N on the M-OI circuit is that there can be no outputs from the M-OI circuit unless all of this second group of signals is present, i.e., if any of these signals I, II through N are missing all of the outputs from the M-OI circuit are inhibited. This type of input is represented by the heavy arrows and will hereinafter be referred to as an overriding input. The first group of signals 1, 2, through *n* will be referred to as normal inputs.

Continuing with the functional description of the general M-OI circuit shown in FIG. 1, when all of the overriding inputs I, II through N, are present at least one of the outputs 11, 12, 13 and 14 is present. If normal input 1 is also present, then output 11 is present. The Boolean expression 1 (I, II . . . N) is an algebraic statement of the inputs to the M-OI circuit required to obtain the output 11. Each of the normal inputs 1, 2, through *n*, has a corresponding output 11, 12 (others not shown) and 13 respectively.

Output 14 is a unique output, the utility of which can be better appreciated in the detailed discussion to follow. The output 14 is present when all of the overriding inputs, I, II through N are present and all of the normal inputs 1, 2, through *n* are <u>not</u> present.

Figures 2, 3:
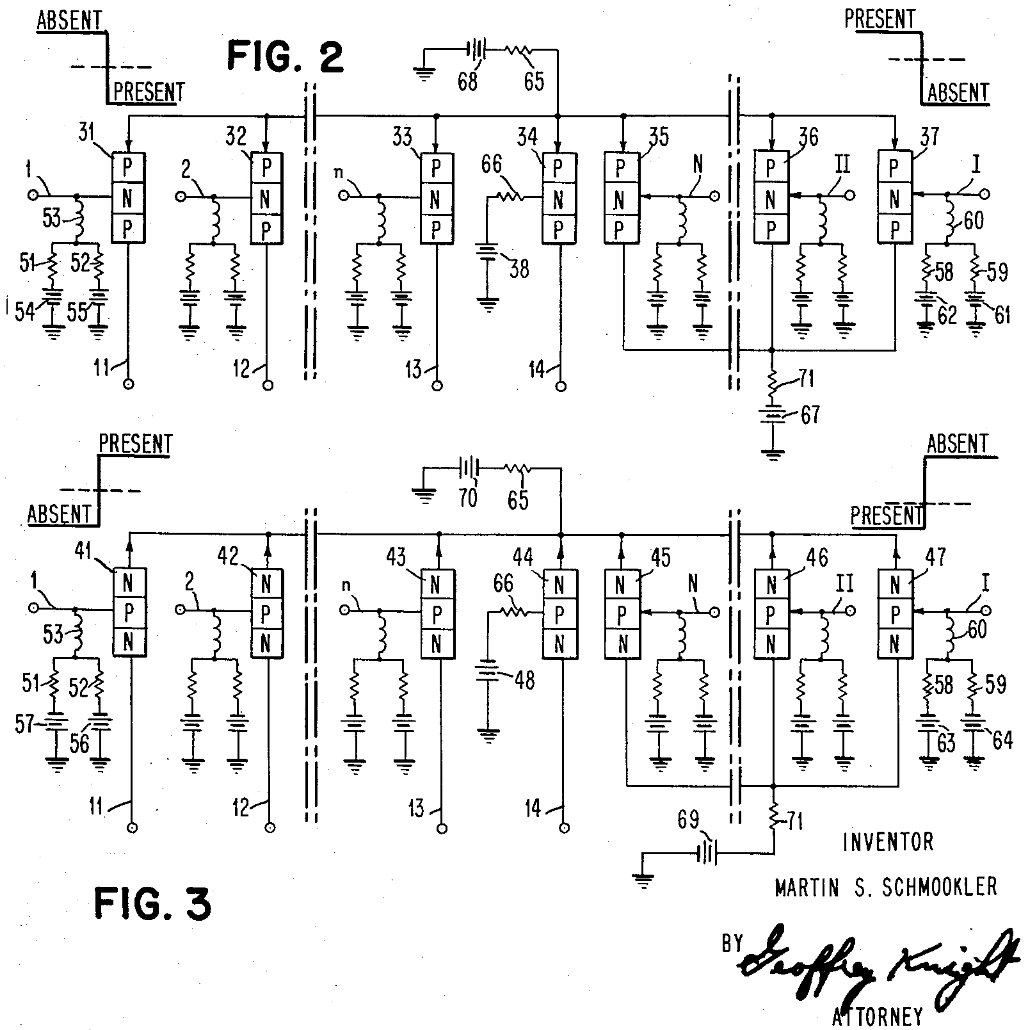
FIGS. 2 and 3 are schematic circuit diagrams of the basic circuit used in this invention.

FIGS. 2 and 3 are schematic circuit diagrams showing the circuitry for accomplishing the functional operation of the M-OI circuit described above. A detailed description of the operation of these circuits will be given subsequently. A further description of the operation and application of this type of circuitry is contained in application Serial Number 22,289 of the present inventor, assigned to the same assignee and filed concurrently herewith.

Figure 4:
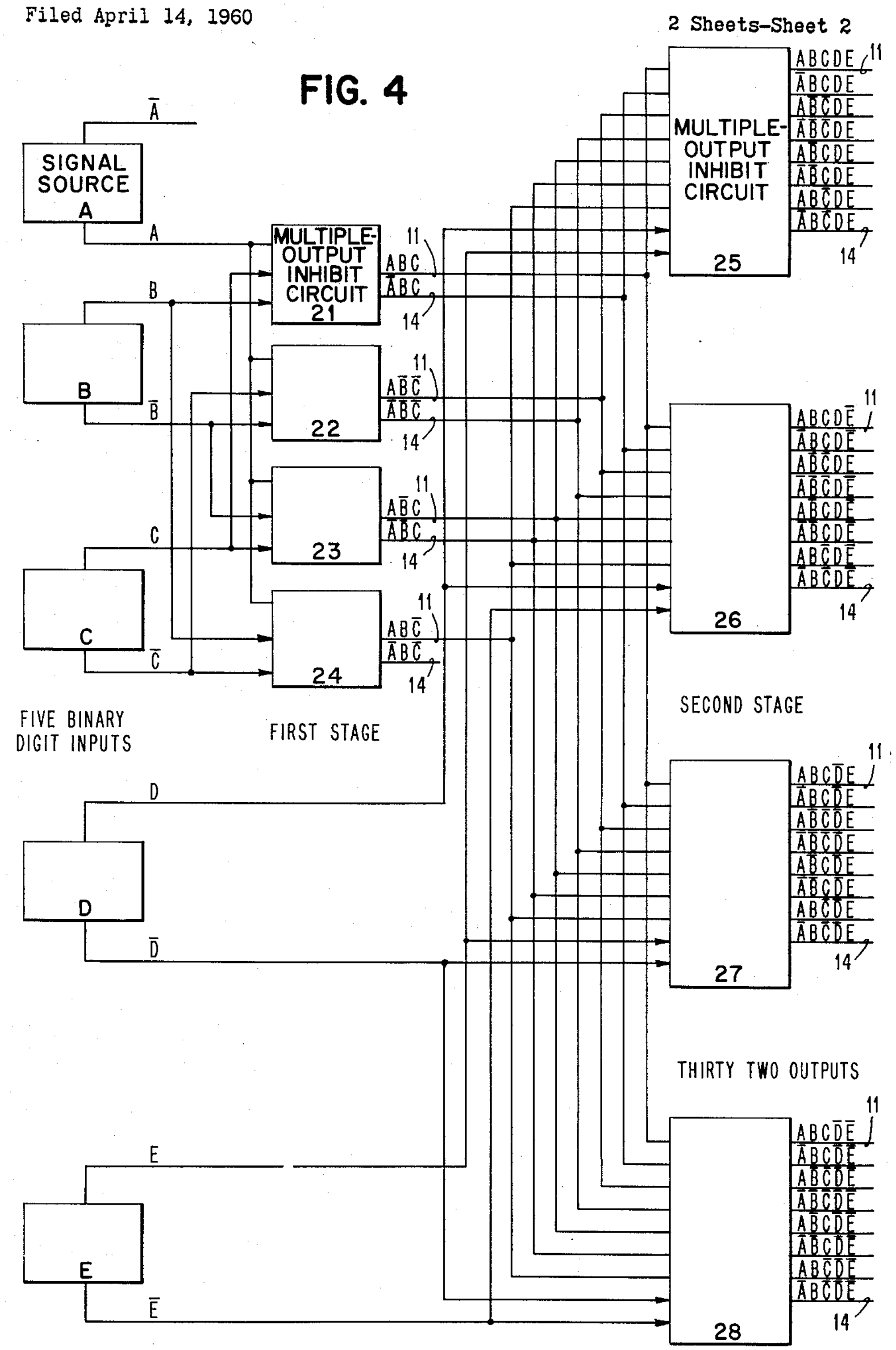
FIG. 4 is a block diagram of an arrangement of several of the basic circuits for performing a decoding operation on five binary digits and providing thirty-two outputs.

There are a variety of ways in which the M-OI circuit can perform a decoding operation. One example is shown in FIG. 4. This example was chosen because it illustrates the use of the output 14 from the general M-OI circuit in FIG. 1, can also be used to illustrate both the single stage and the two stage decoder.

The decoder shown in FIG. 4 decodes five binary digits into thirty-two separate outputs. Each output represents a particular combination of the presence and absence of the five binary digits. Since there are only $2^5$ or 32 possible combinations of the five binary digits, all possible combinations are represented by the outputs and one and only one should be present at any time.

The binary digits are represented by signals from the signal sources A, B, C, D, and E. These signal sources may be any circuit which can provide a signal on one of the outputs if the binary digit is present and provide a signal on the other output if the binary digit is <u>not</u> present. For example, if the binary digit B is present then the output labeled B from the signal source B is present; a signal is present on the output labeled $\overline{B}$ when the binary digit B is <u>not</u> present.

The binary digits A, B, C are decoded in the first stage of the decoder including the M-OI circuits 21, 22, 23 and 24. Each of these M-OI circuits is a more limited form of the general M-OI circuit shown in FIG. 1. Each of these M-OI circuits has two overriding inputs designated by the heavy arrow inputs. Applied to each of the four pairs of overriding inputs is a different combination of the signals labeled B, $\overline{B}$, C, and $\overline{C}$. As an example, the overriding inputs to M-OI circuit 21 receive the signals labeled B and C. If binary digits B and C are present then the two overriding inputs of M-OI circuit 21 are present and none of the other M-OI circuits 22, 23, or 24, have both of their overriding inputs present. Since there are only $2^2$ or 4 different combinations of the two binary digits B and C, all of the different combinations are decoded by the M-OI circuits 21, 22, 23, and 24, one and only one of them having both overriding signals present at one time.

When all of the overriding signals are present to one of the M-OI circuits 21–24, one of the outputs is present from this circuit. The outputs labeled 11 and 14 from each of the M-OI circuits 21–24 in FIG. 4 are functionally the same as the outputs 11 and 14 in FIG. 1. Therefore, when the two overriding inputs to M-OI circuit 21 are present and the signal labeled A on the normal input is present, then output 11 is present; when the normal input A is not present, then output 14 is present. The Boolean expressions at each of the outputs from the M-OI circuits 21–24 are an algebraic statement of the input signals required to obtain the output. It can be seen that all of the $2^3$ or 8 possible combinations of the three binary digits, A, B, and C are represented by these outputs. It may be noted that a $\overline{A}$ signal was not required from the signal source A. The output 14 from the M-OI circuits 21–24 indicates that the normal input A is not present making it unnecessary to have a $\overline{A}$ normal input to each and a corresponding output.

The second stage of the decoder includes M-OI circuits 25, 26, 27 and 28. Each of these M-OI circuits is a limited form of the general M-OI circuit shown in FIG. 1. Each of these M-OI circuits has two overriding inputs which perform the same decoding operation on the binary digits D and E as the two overriding inputs of M-OI circuits 21, 22, 23 and 24 perform on the binary digits B and C. Only one of the M-OI circuits 25–28 has both of its overriding inputs present at one time. Applied to the normal inputs of each of these M-OI circuits 25–28 are all the outputs from the M-OI circuits 21–24 except one (output 14 from M-OI circuit 24). Only one of these normal inputs is present at any one time, since the first stage of the decoder provides only one output at any time. Therefore only one output is received from the M-OI circuits 25–28. For example, if all the binary digits A, B, C, D, and E are present, the output 11 from M-OI circuit 21 is present; both of the overriding signals are present to M-OI circuit 25, and the output 11 is present from M-OI circuit 25 because the corresponding normal input (A, B, C) is present. As another example, if binary digits A and C are not present and binary digits B, D and E are present, then the output 14 is present from M-OI circuit 24; both of the overriding signals are present to M-OI circuit 25 and output 14 is present from this circuit because none of the normal inputs are present.

The first stage of the decoder in FIG. 4 is, by itself, a three binary digit decoder. All five binary digits could be decoded in a single stage by decoding the four binary digits B, C, D and E at once. This is accomplished by having 16 M-OI circuits each having four overriding inputs. By applying the $2^4$ or 16 possible combinations of the four binary digits B, C, D and E, to the overriding inputs of the 16 M-OI circuits, each combination to a different M-OI circuit, only one of them can have all of its overriding inputs present at one time. By applying the binary digit A on the normal input of each of the 16 M-OI circuits the decoding operation is complete in a single stage.

This technique can be extended to decode an infinite amount of binary digits in a single stage limited only by the ability of the signal sources to drive the overriding inputs of all of the M-OI circuits simultaneously. As can be seen in the two illustrations above, the number of M-OI circuits required to completely decode N binary digits in a single stage is $2^{N-1}$ where N is any integer from one to infinity. The number of overriding inputs to each M-OI circuit is $N-1$.

In certain computing operations, it is not necessary to decode all of the possible combinations of a set of binary digits as was done by the decoder in FIG. 4. Sometimes only a single particular combination of the binary digits is desired to be recognized, and when this combination is present then a group of one or more separate signals is desired to be transmitted to other apparatus utilizing these signals. In this application only one M-OI circuit is required. The overriding inputs can recognize the single particular combination of the binary digits and the normal inputs through their corresponding outputs can transmit the group of separate signals to the apparatus utilizing these signals when the particular combination of binary digits is present.

In some computing operations it may be advantageous to have one or more of the binary digits generate signals applied to both the overriding inputs and in the normal inputs of the same M-OI circuit.

The transistor configuration shown in FIG. 2 accomplishes the functional operation of the general M-OI circuit shown in FIG. 1. The normal inputs 1, 2 and *n* are applied to the base of transistors 31, 32, and 33 respectively. The overriding inputs I, II and N are applied to the base of transistors 37, 36 and 35 respectively. Operation of the circuit depends on the voltage levels of the normal and overriding signals at the base of the transistors. The voltage levels of the signals applied to the base of transistors 31–33 is shown near the input to transistor 31. The voltage levels near transistor 37 are applied to transistors 35–37. The voltage level at the base of transistors 35, 36 and 37 is made sufficiently negative when the overriding inputs are absent so that current flows in these transistors in preference to the transistors 31–34 regardless of whether any of the normal inputs are present. This inhibiting of the current flow in transistors 31–34 is accomplished by making the voltage level at the base of transistors 35–37 during the absence of the overriding inputs more negative than the voltage at the base of transistors 31–34 during the presence or absence of the normal inputs. Current is drawn through the transistors 35–37 causing a potential drop across resistor 65. The emitters of transistors 31–34 drop to a potential sufficiently low relative to the potential at their bases so that no conduction takes place through these transistors.

When an overriding input is present to the base of any one of the transistors 35–37 the voltage level is made sufficiently positive to reduce or cut off conduction of current through this transistor. When all of the overriding inputs are present, current is now available for conduction through transistors 31–34. When a normal input is present at the base of any one of transistors 31–33, the voltage is made sufficiently negative so that conduction takes place through this transistor in preference to transistor 34. This is accomplished by making the voltage level during the presence of a normal input more negative than the voltage on battery 38 at the base of transistor 34.

If no normal inputs are present (and all of the overriding inputs are present) the voltage at the bases of all of transistors 31–33 is made sufficiently positive to reduce or cut off conduction in these transistors thereby making current available for conduction through transistor 34. This is accomplished by making the voltage level at the base of each of the transistors 31–33 during the absence of normal inputs more positive than the voltage on battery 38 at the base of transistor 34.

In FIG. 3 an NPN transistor version of the circuit in FIG. 2 is shown. Overriding inputs are applied to the base of transistors 45–47 and normal inputs are applied to the base of transistors 41–43. The operation of the transistors in FIG. 3 is the same as those in FIG. 2; similarly there are three voltage levels applied to the base of these transistors. The first voltage level is one more negative than the voltage on battery 48 and is applied to transistors 41–43 and 45–47. This first voltage level when applied to the base of all of these transistors 41–43 and 45–47 cuts off or reduces conduction in these transistors and causes current to flow through transistor 44. The second voltage level is one more positive than the voltage on battery 48 and is applied to the base of each of transistors 41–43. When this second voltage level is applied to the base of any one of transistors 41–43, it causes that transistor to conduct, and cut off or reduce current flow in transistor 44. The third voltage level is applied to the bases of each of transistors 45–47 and is sufficiently more positive than the second voltage level so that when it is applied to the base of any one of transistors 45–47, it causes that transistor to conduct, and cut off or reduce current flow in transistors 41–44. In this condition the transistors 41–44 are rendered unaffected by the first or second voltage level at their inputs.

Coupling networks are shown in FIGS. 2 and 3. Coupling networks at the base of transistors 31–33 and 41–43 hereinafter called normal coupling networks, are composed of resistors 51 and 52, peaking coil 53 and batteries 54 and 55 for the PNP transistors and batteries 56 and 57 for the NPN transistors. Coupling networks to the base of transistors 35–37 and 45–47, hereinafter called third level coupling networks, are composed of resistors 58 and 59, peaking coil 60, and batteries 61 and 62 for the PNP transistors and batteries 63 and 64 for the NPN transistors. These coupling networks may be used where both the overriding inputs and normal inputs are transistor currents generated by the same type of transistor, for example, where the currents supplied to inputs 1, 2, I, and II in FIG. 2 are generated by the transistors 41–44 in FIG. 3. In this case where the collector currents from the NPN transistors 41–44 provide the currents for the normal inputs to PNP transistors 31 and 32 and also provide the currents for the overriding inputs to PNP transistors 36 and 37, the coupling networks are used to set the proper voltage level at the base of the transistors. The third level coupling networks provide a greater excursion of voltage to the base of transistors 35–37 than the normal coupling networks provide to the base of transistors 31–33.

When the outputs from PNP transistors 31–34 of FIG. 2 are used as the inputs to the NPN transistors 41–43 and 45–47 in FIG. 3, the same coupling networks are used, but the battery voltages, or reference levels are changed.

The following table shows, by way of example, particular values for the potentials of the various batteries, the impedances of the various resistors and peaking coils, and the specifications of transistors used in the circuits of FIGS. 2 and 3. These values are set forth by way of example only and the invention is not limited to them nor any of them.

TABLE I

| | |
|---|---|
| Resistor **51** | 2.15K ohms. |
| Resistor **52** | 187 ohms. |
| Batteries **54** and **61** | 6 volts. |
| Batteries **55** and **62** | 0 volts. |
| Peaking coil **53** | 1.5 micro-henrys. |
| Resistor **58** | 365 ohms. |
| Resistor **59** | 3.92K ohms. |
| Peaking coil **60** | 2.7 micro-henrys. |
| Resistor **65** | 4.5K ohms. |
| Resistor **66** | 82 ohms. |
| Battery **38** | 0 volts. |
| Battery **67** | 6 volts. |
| Battery **68** | 30 volts. |
| Battery **69** | 0 volts. |
| Battery **70** | 36 volts. |
| Batteries **56** and **63** | 6 volts. |
| Batteries **57** and **64** | 12 volts. |
| Battery **48** | 6 volts. |
| PNP transistors **31–37**, and NPN transistors **41–47** | $\alpha > .95$ with a maximum of 0.4 volt, emitter to base voltage drop with 6 milliamperes collector current and a minimum emitter to base breakdown voltage of 3.5 volts. |

The transistor circuits shown in FIGS. 2 and 3 may be used in the block diagram in FIG. 4 in the following manner. M-OI circuits 21–24 contain the PNP transistor configuration shown in FIG. 2 including transistors 33–36 and their associated coupling networks. M-OI circuits 25–28 contain the NPN transistor configuration shown in FIG. 3 including transistor 41–43 (plus four more not shown connected in the same manner as transistors 41–43) and transistors 44–46 and their associated coupling networks. The collector outputs from the PNP transistor circuits are connected to the inputs of the NPN transistor circuits. The signal sources A, B, and C may be of the NPN transistor type while the signal sources D and E may be of the PNP transistor type. Such signal sources are disclosed in Patent No. 2,964,652 filed November 15, 1956, by the same assignee.

The following tables show by way of example, particular ranges of voltage levels found to be suitable for proper operation of the circuits shown in FIGS. 2 and 3 when applied to the bases of the transistors. These voltage levels may be generated by the signal sources providing the normal and overriding inputs to the M-OI circuits. Where the signal sources are capable of providing only two voltage levels the coupling networks shown in FIGS. 2 and 3 may be used to provide the three voltage levels shown in the tables below. These values are set forth by way of example only and the invention is not limited to them nor any of them.

TABLE II

*PNP circuit, FIG. 2*

| | Normal Input | Overriding Input | Range of Voltage |
|---|---|---|---|
| First Level | absent | present | .4 to .57. |
| Second Level | present | | −.4 to −.96. |
| Third Level | | absent | −1.36 to −2.29. |

TABLE III

*NPN circuit, FIG. 3*

| | Normal Input | Overriding Input | Range of Voltage |
|---|---|---|---|
| First Level | absent | present | −6.4 to −6.57. |
| Second Level | present | | −5.04 to −5.4. |
| Third Level | | absent | −3.71 to −4.64. |

While the invention has been particularly shown and described with reference to a preferred embodiment thereof, it will be understood by those skilled in the art that various changes in form and details may be made therein without departing from the spirit and scope of the invention.

What is claimed is:

1. A decoding circuit for providing a plurality of transistor output currents, conduction in each output transistor being responsive to the presence or absence of a corresponding one of a first set of signals and controlled by the presence of a particular combination of a second set of signals, said decoding circuit comprising, a plurality of transistor circuits, each of which includes a plurality of transistors having their emitters joined in common, a voltage source, an impedance connected between said voltage source and said emitters, a reference voltage source, a first signal coupling means for providing a signal capable of residing at a voltage level above said reference voltage or below said reference voltage, at least one second signal coupling means for providing a signal capable of residing at a voltage level above said reference level or below said reference level, at least one of said voltage levels provided by said second signal coupling means being of a greater excursion from said reference voltage than the voltage levels provided by said first signal coupling means, said reference voltage, said first signal coupling means and said second signal coupling means each being connected to the bases of different ones of said transistors to control the conductivity thereof, whereby the transistor having said reference voltage source connected to its base is capable of conducting only when no other transistors are conducting, and the transistor having said first signal coupling means connected to its base is capable of conducting only when none of said transistors having said second signal coupling means connected to their bases is conducting, circuit means for applying each one of said first set of signals to a different one of said first signal coupling means in each said transistor circuit, circuit means for applying a different combination of said second set of signals to the second signal coupling means of respective different ones of said transistor circuits, whereby in each transistor circuit the transistor having said reference voltage source connected to its base is capable of conducting only when all of said first set of signals are absent and a particular combination of said second set of signals is present, thereby providing one of said transistor output currents, and each of the transistors having said first signal coupling means applied to its base is capable of conducting only when one of said first set of signals is present and a particular combination of said second set of signals is present, thereby providing other of said transistor output currents.

2. A decoding circuit for decoding a set of signals representing N binary digits and providing $2^N$ output currents, each of said output currents being generated in response to a particular combination of the presence or absence of each of said N binary digits, said decoding circuit comprising, $2^{N-1}$ transistor circuits, each of which includes a plurality of transistors having their emitters jointed in common, a voltage source, an impedance connected between said voltage source and said emitters, a reference voltage source, a first signal coupling means for providing a signal capable of residing at a voltage level above said reference voltage or below said reference voltage, $N-1$ second signal coupling means for providing a signal capable of residing at a voltage level above said reference level or below said reference level, at least one of said voltage levels provided by said second signal coupling means being of a greater excursion from said reference voltage than the voltage levels provided by said first signal coupling means, said reference voltage source, said first signal coupling means and said second signal coupling means each being connected to the bases of different ones of said transistors to control the conductivity thereof, whereby the transistor having said reference voltage source connected to its base is capable of conducting only when no other transistors are conducting, and the transistor having said first signal coupling means connected to its base is capable of conducting only when none of said transistors having said second signal coupling means connected to their bases is conducting, circuit means for applying one of said signals representing one of said N binary digits to the first signal coupling means in each of said $2^{N-1}$ transistor circuits, circuit means for applying a different one of the $2^{N-1}$ combinations of the remaining unconnected signals representing $N-1$ binary digits to the $N-1$ second signal coupling means of respective different ones of said $2^{N-1}$ transistor circuits, whereby the transistor having said reference voltage source connected to its base is capable of conducting only when said signal applied to the first signal coupling means is absent and a particular one of said $2^{N-1}$ combinations is present, thereby providing one of said transistor output currents, and the transistor having said first signal coupling means connected to its base conducts only when said signal applied to said first signal coupling means is present and a particular one of said $2^{N-1}$ combinations is present, thereby providing another of said transistor output currents.

3. The decoding circuit of claim 2 above, further comprising a plurality of additional transistor circuits similar to said aforementioned transistor circuits, a plurality of first coupling means associated with each of said additional circuits, means connecting selected ones of said transistor output currents to one of said first coupling means associated with each of said additional circuits, a plurality of second coupling means associated with each of said additional transistor circuits, and means coupling additional input signals to selected ones of said second coupling means associated with said additional circuits.

No references cited.